Oct. 9, 1928.

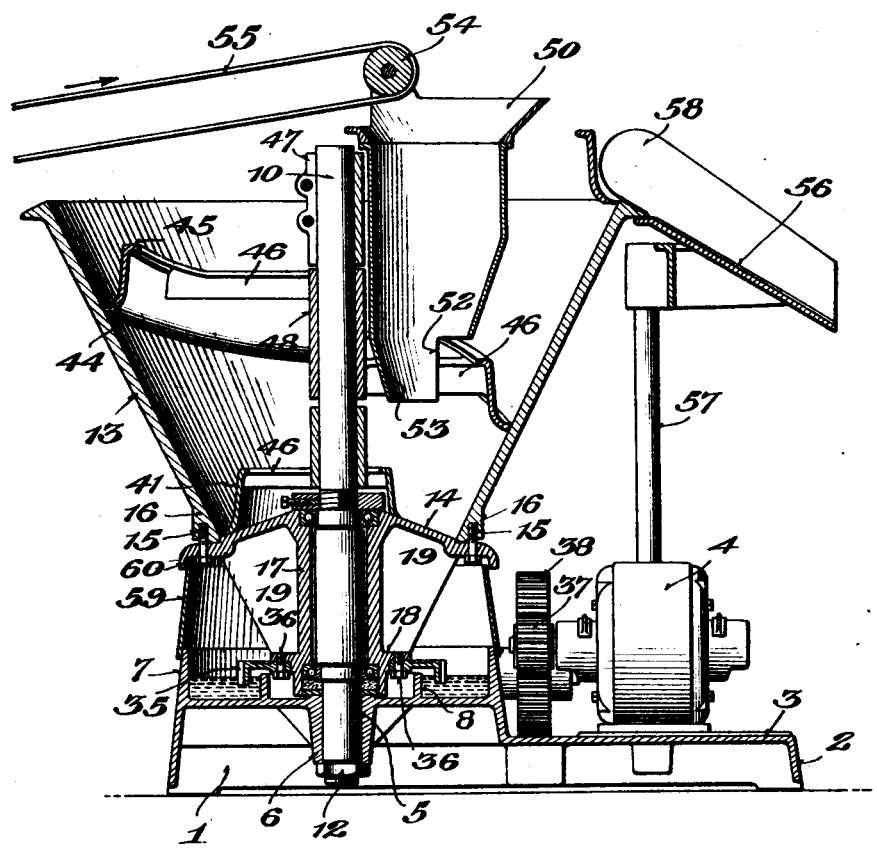

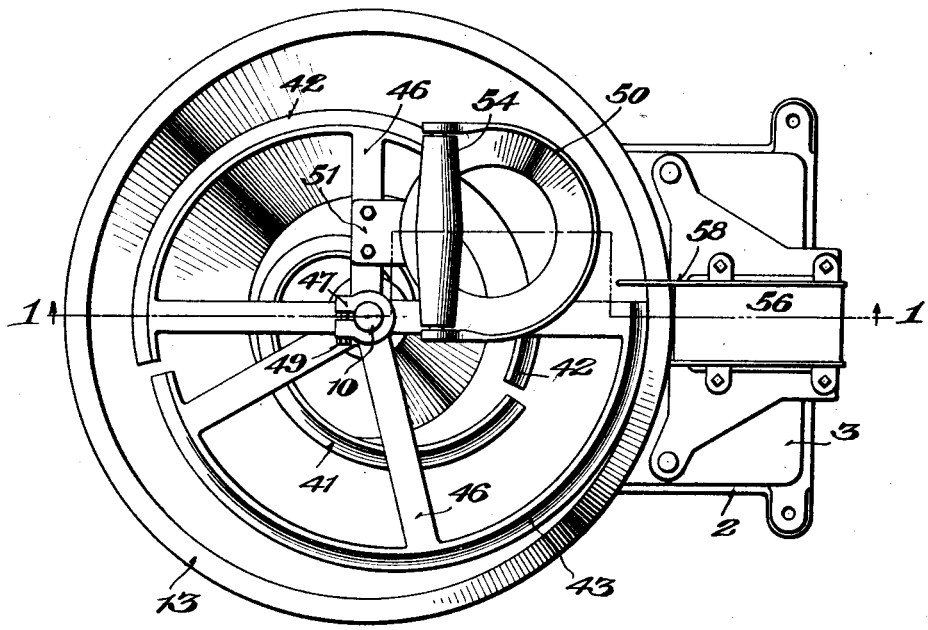
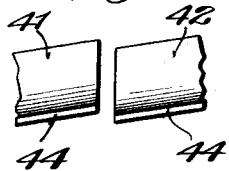

H. H. HACKSTEDDE 1,686,853

APPARATUS FOR ROUNDING UP LUMPS OF PLASTIC MATERIAL

Original Filed July 21, 1921   3 Sheets-Sheet 3

Inventor
H. H. Hackstedde,

WITNESS:—
Chas. L. Grieshauer

By Hubbard & Hubbard
his Attorneys

Patented Oct. 9, 1928.

1,686,853

UNITED STATES PATENT OFFICE.

HERBERT H. HACKSTEDDE, OF CINCINNATI, OHIO.

APPARATUS FOR ROUNDING UP LUMPS OF PLASTIC MATERIAL.

Original application filed July 21, 1921, Serial No. 486,510. Divided and this application filed December 6, 1922. Serial No. 605,207.

This invention relates to dough rounding up machines of the type employing a rotatable conical bowl and an internal stationary spiral trough member cooperating with the walls of the bowl to form a spiral trough in which rough lumps of dough or other plastic material may be formed into smooth round lumps by the rotatable action thereon of the conical bowl.

This application is a division of my copending application, Serial No. 486,510, filed July 21, 1921.

Some of the objects of the present invention are to provide for avoiding the use of dusting flour commonly employed to prevent sticking of the dough upon stationary parts of the machine; to prevent the pinching off of small particles or nodules from the lumps of dough, during the forming up operation, as commonly occurs in rounding up machines as generally constructed; to improve the mounting of the stationary trough member so as to maintain the same at all times concentric with the bowl; to provide for feeding the rough lumps of dough into the bottom of the rotating bowl in such a manner as to deposit the lumps upon a moving portion of the machine; and to provide for imparting movements to the lumps of dough, during their travel through the trough, in addition to the movements imparted thereto by the rotating bowl, for the purpose of more perfectly shaping up the lumps of dough.

With these and other objects in view, the present invention consists in the combination and arrangement of parts as will be hereinafter more fully described, illustrated in the accompanying drawings, and particularly pointed out in the appended claims, it of course being understood that changes in the form, proportion, size and minor details may be made, within the scope of the claims, without departing from the spirit or sacrificing any of the advantages of the invention.

In the drawings:

Figure 1 is an irregular vertical sectional view taken on the line 1—1 of Figure 2.

Figure 2 is a top plan view of a rounding up machine embodying the features of the present invention.

Figure 5 is a detail fragmentary view showing the relation of the adjacent ends of successive trough sections.

Figure 3:
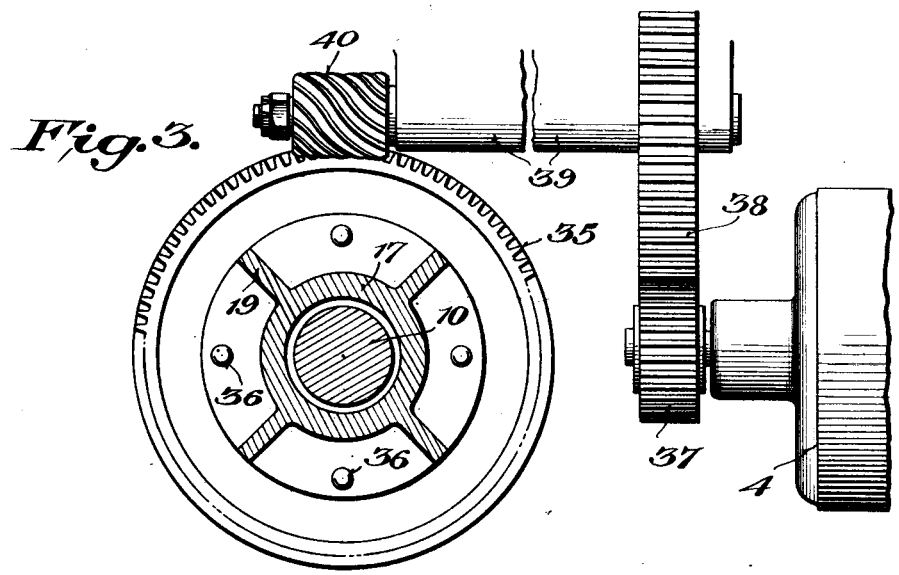
Figure 3 is an enlarged fragmentary plan section showing the drive connection between the motor and the rotatable bowl.
Figure 4:
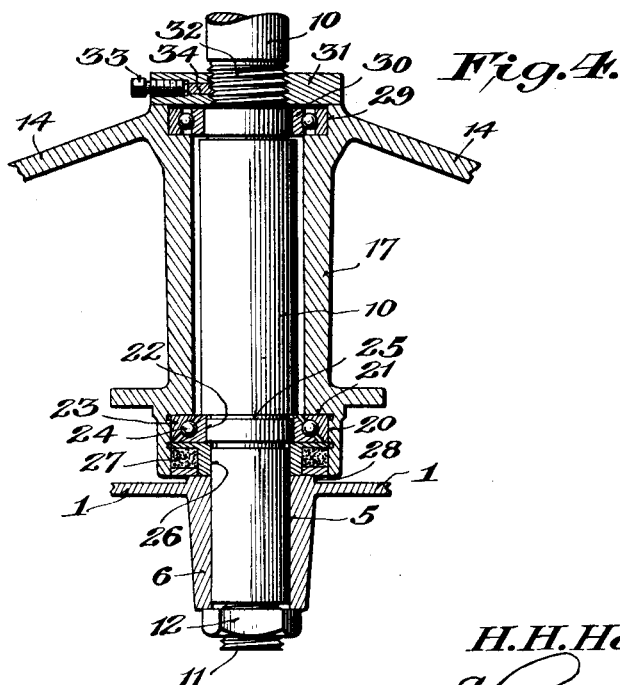
Figure 4 is an enlarged fragmentary sectional view illustrating the manner of supporting the central post and the manner of rotatably mounting the bowl thereon.

The present machine includes a base 1 provided with a suitable depending foot flange 2, said base having a lateral extension 3 for the support of a suitable motor 4 employed for driving the moving parts of the present machine. The base 1 is provided with a central opening 5 and a depending tubular boss 6 forming a continuation of the walls of said opening. The base 1 is of substantially circular form and provided with an upstanding cylindrical flange 7 around the outer periphery thereof, and an inner upstanding circular flange 8, the two flanges defining a trough for containing a suitable liquid lubricant 9.

Rising centrally from the base 1 is a post or standard 10 which has its foot stepped within the boss 6, the lower extremity of the post being threaded, as shown at 11, said threaded portion extending a suitable distance below the bottom of the boss 6 and carries a nut 12 designed to be set up tightly against the bottom of the boss 6 so as to rigidly support the post in position as will hereinafter appear.

Disposed concentrically with the post 10 is a drum in the form of a conical bowl 13 having its smaller end directed downwardly and closed by a bottom plate 14 preferably convexed upwardly. The outer peripheral edge of the bottom plate underlies the bottom of the bowl and is secured thereto by suitable fastenings 15 extending upwardly through the bottom plate and into bosses 16 at the bottom and on the exterior of the bowl. The middle of the bottom plate 14 is provided with a central opening to receive the post 10, and a cylindrical sleeve 17 depends from the bottom plate 14 concentric with the opening therein. There is an external annular horizontal flange 18 just above the bottom of the sleeve, and upright radial wings or ribs 19 extend outwardly from the sleeve and connect the flange 18 and the plate 14. The parts 14, 17, 18 and 19 are integral and are formed as a single casting. The lower end of the sleeve 17 is counterbored as at 20, whereby an internal annular flange 21 is provided at the top of the counterbore. Within the counterbore there is a ball race made up of an inner ring 22 and an outer ring 23 within which are anti-friction devices 24. The outer ring 23 underlies the shoulder 21, while the inner ring 22 underlies an annular shoulder 25 on the post. The outer ring 23 is entirely outside of the shoulder 25. Within the bore and below the ball race is a packing ring 26 containing suitable packing 27 capable of absorbing a lubricant. The packing ring 26 underlies and supports the ball race members 22 and 23 and is in turn supported upon the base 1, the latter being preferably provided with a slight elevation or boss 28 so as to maintain the bottom of the sleeve 17 above and out of contact with the base 1. It will now be understood that by manipulation of the nut 12, the post 10 may be drawn downwardly so as to impinge its shoulder 25 against the ball race member 22 and thereby rigidly support the post upon the base, while the sleeve 17, and the bowl 13 may rotate freely upon the post.

The top of the sleeve 17 is counter-bored as at 29 to receive a suitable anti-friction bearing 30, whereby the sleeve 17 has anti-friction bearings at the top and bottom thereof, which bearings are spaced at such a distance as to prevent wobbling of the bowl and to maintain the latter in its proper concentric relation with the post. Above the top of the sleeve 17 is a collar 31 in the form of a nut fitted to the screw threaded part 32 of the post and designed to prevent upward movement of the sleeve 17 on the post. The nut 31 may be adjustably locked in any suitable manner, as for instance by means of a setscrew 33 extending radially through the nut into engagement with a bit 34 engaged with the threads 32. It will here be explained that the nut 31 is not set down tightly against the top of the sleeve but is set in close proximity thereto so as to be out of contact therewith but at the same time is designed to prevent any material upward play or movement of the bowl 13.

Secured to the underside of the flange 18, at the bottom of the sleeve 17 is a gear 35, the toothed periphery of which travels in the lubricant 9 in the trough defined by the upstanding flanges 7 and 8. Any suitable means may be provided for securing the gear 35 to the flange 18, as for instance by screw threaded fastenings 36 extending upwardly through the hub of the gear and into the flange 18.

Power is transmitted from the motor 4 to the bowl by means of a pinion 37 mounted upon the motor shaft and in engagement with a gear 38 mounted upon a shaft 39 provided with a worm 40 in mesh with the worm gear 35 and therefore operating in the lubricant 9.

Cooperating with the interior walls of the rotating bowl 13 there is a stationary trough member in the form of a spiral and divided into three sections designated respectively 41, 42 and 43. Each section is a portion of a spiral and has the cross sectional shape shown in Figure 1 of the drawings. Each stationary trough section is in the form of an upstanding web inclined slightly to the vertical and away from the adjacent wall of the bowl 13 so as to define, with the latter, a substantially V-shaped trough or race-way. The bottom edge portion of the trough section is rounded or concaved and extends outwardly to form a dished bottom flange 44, the outer edge thereof being beveled and disposed in substantial parallelism with the adjacent wall of the bowl. The space between the bowl and the beveled edge of the trough section is very slight and just sufficient to permit rotation of the bowl without frictional contact with the stationary trough section. The top of each spiral trough section is provided with a substantially horizontal internal flange 45, and from this flange extend arms 46 which are connected to the respective split sleeves 47, 48 and 49 rigidly and adjustably clamped upon the post 10 by suitable screw threaded fastenings, one of which has been shown at 49 in Figure 2 of the drawings. By reference to Figure 2 of the drawings it will be seen that the lowermost trough section 41 leads from its split sleeve 49 close to the post 10 and continues in a spiral course in cooperative relation with the bowl to a point substantially diametrically opposite its connection with the clamping sleeve. The next successive trough section 42 leads upwardly from the upper end of the trough section 41 and, as best shown in Figure 5 of the drawings, it will be seen that the adjacent ends of the trough sections are spaced in the spiral direction, and the lower or adjacent end of the trough section 42 is slightly below the upper end of the trough section 41. In other words the upper discharge end of the lower trough section is slightly above the lower feed-in end of the next above trough section, and this relation is true of the adjacent ends of the several successive trough sections. The purpose of this peculiar relation will be hereinafter explained.

The rough lumps of dough are introduced into the machine through a suitable chute or hopper 50 disposed in a vertical position in substantial parallelism with the upper portion of the post held in place by a bracket 51 on one of the arms 46 of the trough section 42. The lower portion of the hopper is notched or cut away as at 52 to accommodate one of the trough sections, as well shown in Figure 1 of the drawings. The lower discharge end portion of the chute or hopper extends well down into the bowl and has an inclined or deflected portion 53 inclined downwardly and outwardly from the post 10. Mounted across the top of the chute or hopper 50 and adjacent the post 10 is a suitable pulley or roller 54 around which travels a suitable conveyor 55 employed for feeding rough lumps of dough to the feed chute or hopper 50.

Mounted at one side of the bowl 13, preferably opposite the conveyor 55 is a discharge chute 56 supported upon a suitable post or standard 57 rising from the extension 3 of the base. This chute is equipped with an abutment 58 overlying the adjacent top edge portion of the bowl and extending across the discharge upper end of the trough defined by the bowl and the stationary trough member.

In the operation of the machine, dough or other plastic material in rough lumps is placed upon the conveyor 55 and fed to the open top of the chute 50, which latter directs the lumps downwardly and into the bottom portion of the rotating bowl 13. The cooperative action of the rotating bowl and the stationary trough member not only causes the lump of dough to travel spirally upward through the trough defined by the bowl and the stationary trough member but also causes the lump of dough to rotate on an axis, thereby rounding up or giving shape to the lump of dough. When the shaped lump of dough reaches the top of the trough, it comes into contact with the abutment 58 and is deflected in the discharge chute 56 whereby it is directed away from the machine. In addition to the bodily travel and rotation about an axis, the lump of dough is also given another movement as will best be understood by reference to Figure 5 of the drawings. Inasmuch as the inlet end of the stationary trough section 42 is slightly below the discharge end of the trough section 41, a lump of dough leaving the trough section 41 and dropping downwardly to the somewhat lower portion of the trough section 42, will be given a rotation upon a substantially horizontal axis and will change its general relation to the walls of the trough, whereby new portions of the lump of dough will be brought into cooperative relation with the walls of the trough, and thus the lump of dough will be effectually shaped into a substantially spherical ball when it leaves the top of the machine.

As hereinbefore described, the lower edge of the trough is in close proximity to the inner walls of the rotatable drum or bowl 13 but not in contact therewith, thereby to avoid friction, and by reason of the very close relation of the lower edge of the trough and the bowl pinching off of small particles or nodules from the lumps of dough is effectually prevented. This predetermined spaced relation of the trough and the bowl is maintained by the balls or rollers interposed between the sleeve 17 and the post 10, and while the balls or rollers of course have antifriction characteristics, the prime purpose of the balls or rollers is to center the rotatable bowl upon the post and thereby maintain the predetermined spaced relation between the bowl and the trough.

As a further contribution to the maintenance of the proper spaced relation between the bowl 13 and the lower edge of the trough, I employ the worm and gear drive, best shown in Figure 3 of the drawings, said worm 40 and gear 35 having a very accurate fit so as to prevent any play between these members, because any such play would necessarily impart an irregular rotation to the bowl 13 which in turn would produce wear and a consequent wobbling of the bowl 13 which of course would result in the varying of the space between the walls of the bowl and the trough. In addition to having the accurate fit between the worm 40 and the gear 35, I mount these members so that they operate in a liquid lubricant contained in the channel defined by the flanges 7 and 8. It will therefore be understood that the spaced bearings between the sleeve 17 and the post 10, together with the worm and gear drive operating in a lubricant, cooperate to maintain the lower edge of the stationary spiral trough properly spaced with respect to the interior walls of the rotating bowl 13.

There is something peculiar about dough, and that is this, if it is handled quickly, i. e. not allowed to stay in contact with metal for any material length of time, it will not adhere to the metal, whereas, if it is allowed to lie in contact with metal, even for a short time, it will adhere thereto, necessitating the use of something to prevent the adhering or sticking of the lump of dough to the walls of the trough. It is customary to use dusting flour to prevent adhering or sticking of the lump of dough to the walls of the trough. The use of dusting flour is a waste to the baker and a detriment to the loaf of bread produced under such conditions.

As hereinbefore indicated it is an important object of the present invention to prevent the lumps of dough from adhering to the walls of the trough, and this is accomplished by introducing the lump of dough into the machine in such a manner that it first engages the inclined rotating surface of the bowl, whereby the lump of dough has no opportunity to remain in contact with the metal surface of the bowl long enough to adhere thereto, and by the time the lump of dough comes into contact with the stationary trough section, it will have acquired momentum enough to prevent adherence of the dough to the stationary trough section. As the lump of dough is fed along the trough no portion thereof remains in contact with the walls of the trough long enough to adhere thereto, and consequently the rounding up operation may be accomplished without the employment of dusting flour and its attendant disadvantages.

The annular space between the base 1 and the bottom 14 of the rotating bowl is closed by a substantially cylindrical shell or casing 59 externally embracing and suitably secured to the flange 7, the upper edge of the casing lying within the depending annular flange 60 on the outer periphery of the bottom plate 14. The purpose of this shell or casing is to exclude foreign matter from the lubricant contained within the channel defined by the flanges 7 and 8, and in this particular it will be noted that the joints at the top and bottom of the casing 59 open downwardly so that any foreign matter falling upon the exterior of the apparatus will not have an opportunity to work its way into the lubricant.

What is claimed is:

1. In a machine of the class described, the combination of a base having a lubricant containing channel on the top thereof, a post rising from the base, a rotatable bowl mounted upon the post and provided with a gear traveling in the channel of the base, driving means associated with the gear, and a stationary spiral trough member carried by the post.

2. In a machine of the class described, the combination of a base, a post rising therefrom, the base being provided upon its top with a lubricant containing channel spaced from and surrounding the post, a bowl rotatably mounted upon the post and provided with a driving gear working in the channel, a shield closing the space between the top of the channel and the bowl, and a spiral trough element cooperating with the bowl and supported upon the post.

3. In a machine of the class described, the combination of a base, a post rising therefrom, a rotatable bowl concentric with the post, a sleeve separate from and disposed below the bowl and rotatable upon the post, said sleeve being provided with a flange constituting the bottom of the bowl, fastenings securing the bowl to the flange and a stationary spiral trough element supported on the post in cooperative relation with the bowl.

4. In a machine of the class described, the combination of a base, a post rising therefrom, a rotatable bowl concentric with the post, a sleeve depending from the bottom of the bowl and rotatably embracing the post, anti-friction bearings between the post and the sleeve at opposite ends of the sleeve, and a stationary spiral trough element carried by the post and in cooperative relation with the bowl.

5. In a machine of the class described, the combination of a base, a post rising therefrom, a rotatable bowl concentric with the post, the bottom of the bowl having a sleeve depending therefrom and rotatably embracing the post, anti-friction bearings between the sleeve and the post at opposite ends of the sleeve, a driving gear carried by the bottom of the sleeve, and a stationary spiral trough element in cooperative relation with the bowl.

6. In a machine of the class described, the combination of a base, a post rising therefrom, the top of the base being provided with an annular lubricant containing channel spaced from and surrounding the post, a rotatable bowl concentric with the post, a sleeve depending from the bottom of the bowl and rotatable upon the post, anti-friction bearings between the post and the sleeve and at opposite ends of the latter, the bottom of the sleeve lying between the channel and the post, a driving gear carried by the sleeve and running in the channel, and a spiral stationary trough element carried by the post and cooperating with the bowl.

7. In a machine of the class described, the combination of a base, a post rising therefrom, the top of the base being provided with an annular lubricant containing channel surrounding and spaced from the post, a rotatable bowl concentric with the post, a removable bottom for the bowl, a sleeve depending from the bottom of the bowl and rotatably embracing the post, the bottom of the sleeve lying between the post and the annular channel, a driving gear carried by the sleeve and working in the channel, a shield extending between the channel and the bottom of the bowl, and a stationary spiral trough element carried by the post and in cooperative relation with the bowl.

8. In a machine of the class described, the combination of a base having an opening therethrough, a post having its lower end extending through the opening in the base and terminally screw threaded, the post having an annular shoulder above the base, a rotatable bowl concentric with the post, an anti-friction bearing between a portion of the bowl and the post, said bearing having a stationary part lying between the base and the shoulder on the post, and a nut carried by the screw threaded part of the post and engaging the underside of the base to impinge the shoulder of the post against the stationary part of the bearing to secure the post in place.

9. In a machine of the class described, the combination of a base having an opening therethrough and a boss depending from the base at the opening therein, a post rising through the boss and provided with an annular shoulder above the base, a rotatable bowl concentric with the post, a sleeve depending from the bottom of the bowl and rotatable upon the post, an anti-friction bearing between the sleeve and the post, a stationary part of the bearing lying between the shoulder and the base, and a nut on the bottom of the post for engagement with the bottom of the boss to impinge the shoulder on the stationary member of the bearing to secure the post in place.

10. In a machine of the class described, the combination of a base having an opening therethrough and a boss depending from the base at the opening, a post rising through the boss and provided with an annular shoulder adjacent the base, a rotatable bowl concentric with the base, a sleeve depending from the bottom of the bowl and counterbored at its top and bottom, anti-friction bearings between the post and the sleeve and located in the respective counterbores, a stationary member of the lower bearing lying between the shoulder of the post and the base, and means cooperating with the bottom of the post and the bottom of the boss to impinge the shoulder against said stationary bearing member to secure the post in place.

11. In a machine of the class described, the combination of a revolving element to provide movement to the plastic mass through the machine, a stationary trough set at an angle to the line of motion of said revolving element, one edge of said trough in close proximity but not touching the surface of said revolving element, a support for the stationary trough, and means for maintaining the revolving element and trough in predetermined spaced relation and including balls or rollers interposed between said support and revolving element.

12. In a machine of the class described, the combination of a revolving bowl, a stationary trough set at an angle to the line of motion of said bowl, the bowl and trough being spaced in a predetermined relation, a post to support the trough, and means for maintaining the predetermined spaced relation between the bowl and the trough and including balls or rollers interposed between said post and revolving bowl to support the bowl from the post.

13. In a machine of the class described, the combination of a bowl, a trough cooperating with the walls of the bowl, the bowl and trough being spaced in a predetermined relation, a post, one of the two first mentioned members being rigidly supported upon the post and the other of said first mentioned members being rotatably mounted upon the post, and means to maintain the spaced relation of the bowl and trough and including rotating devices interposed between the post and said rotatable member to center the same thereon.

14. In a machine of the class described, the combination of an upright drum, an upright spiral trough concentric with the drum and cooperating therewith to form a trough, the drum and trough being spaced in a predetermined relation, an upright post, one of the two first mentioned members being rigidly supported upon the post and the other of said first mentioned members being rotatably mounted upon the post, and means to maintain the spaced relation of the drum and trough, said means including upper and lower sets of rotating devices interposed between the post and the said rotatable member to center the same thereon and to prevent wobbling thereof.

15. A forming machine for plastic material comprising a rotatable conical table having an elongated sleeve portion; a non-rotatable vertical shaft extending through and journalled at the ends of said sleeve portion; and a dough race attached to said shaft, extending spirally and helically over said table, the ends of said sleeve being disposed so as to provide relatively high and low bearings for the table, and means comprising a gear attached to the outside of said sleeve adapted to mesh with a driving member whereby the table may be rotated about the fixed shaft and dough race.

HERBERT H. HACKSTEDDE.